United States Patent [19]

Tibbetts et al.

[11] 4,325,743

[45] Apr. 20, 1982

[54] PROCESS FOR THE ENHANCEMENT OF CARAMEL COLORANT

[75] Inventors: Merrick S. Tibbetts, South Salem, N.Y.; Gareth J. Templeman, Lewisville, Tex.

[73] Assignee: PepsiCo, Inc., Purchase, N.Y.

[21] Appl. No.: 259,701

[22] Filed: May 1, 1981

[51] Int. Cl.$^3$ .............................................. C13D 3/12
[52] U.S. Cl. .................. 127/46.2; 127/5 G; 210/657; 426/540
[58] Field of Search ................... 127/46 B, 56, 34, 55; 210/787, 788, 657; 426/540

[56] References Cited

U.S. PATENT DOCUMENTS

| | | | |
|---|---|---|---|
| 32,622 | 6/1861 | Fryatt | 127/56 |
| 294,798 | 3/1884 | Lillie | 210/787 |
| 2,504,169 | 4/1950 | Wolfrom et al. | 127/55 |
| 2,524,414 | 10/1950 | Wolfrom et al. | 127/34 |
| 2,701,768 | 2/1955 | Cleland et al. | 127/34 X |
| 2,767,108 | 10/1956 | Fetzer | 127/34 |
| 3,075,694 | 1/1963 | Anderson | 210/787 X |
| 3,249,444 | 5/1966 | Bollenback et al. | 127/34 |
| 3,617,557 | 11/1971 | Giltrow | 210/657 |
| 4,116,948 | 9/1978 | Mittenzwei et al. | 210/657 X |

OTHER PUBLICATIONS

Stinson and Willets; Journ. Assoc. Offic. Anal. Chem. 46 (2), pp. 329–330; 1963.
Gel Filtration by the Sephadex Centrifugal Method; Technical Data Sheet, Pharmacia Fine Chemicals Inc., Piscataway N.J.

*Primary Examiner*—Kenneth M. Schor
*Attorney, Agent, or Firm*—Bernard, Rothwell & Brown

[57] ABSTRACT

Disclosed is a process for the rapid enhancement of caramel colorant which comprises passing a liquid containing caramel colorant through a size exclusion chromatographic material while subjecting the liquid to centrifugal forces. The process for the enhancement of caramel colorant can be conducted in a relatively short period of time and produces a caramel colorant of improved coloring power and a reduced content of undesirable or non-color contributing substances.

5 Claims, No Drawings

PROCESS FOR THE ENHANCEMENT OF CARAMEL COLORANT

BACKGROUND OF THE INVENTION

The present invention relates to a process for enhancing the properties of caramel colorants, and more particularly, to a process for the color enrichment and desalting of caramel colorant utilizing centrifugal size exclusion chromatography.

Caramel colorant is a coloring agent widely used in food, pharmaceutical and beverage manufacturing industries, most particularly in the manufacture of cola-type soft drinks. The caramel colorant is used to impart the amber shade extensively found in carbonated beverages, pharmaceutical and flavoring extracts, candies, soups, bakery products and numerous other foods. Caramel colorant is made commercially by heating a solution of sugar with or without the addition of a catalyst in a process known as caramelization. Heating the solution during caramelization causes several complex chemical reactions such as polymerization, rearrangement and condensation to occur. In currently used caramelization processes, the extent of heating is limited because if the heating treatment is too extensive, additional reactions occur which impart undesirable characteristics to the caramel colorant product such as charring, unmanageable viscosities, diminished solubility and instability which may lead to the tendency for the colorant to resinify on storage. Commercial caramel colorant, which has not been refined beyond the conventional caramelization and having a minimum of undesirable properties, contains color-imparting solids accounting for less than one-half of the total solids contained in the product, the remainder of the solids being materials not contributing directly to the coloring power of the mixture. Attempts have been made to determine the various constituents in caramel colorant by a variety of means but the constituents revealed in preliminary tests have indicated the complexity of the product and have often dissuaded further investigations. These attempts have revealed however that the color-imparting solids of the colorant are of relatively high molecular weight whereas the remainder of the materials which do not impart color are of relatively low molecular weight.

The coloring power, or tinctorial power, of caramel colorant is the basis on which it is marketed commercially. The higher the coloring power, the more attractive the product is to the user. The amber shade produced by caramel colorant has become so fixed in the consumer's acceptance of certain foods and beverages that when these products have low or lighter color intensity, it often causes the food or beverage to be viewed as being inferior or lacking in strength. Therefore, it becomes a necessity for manufacturers of commercial caramel colorant to have economical processes for supplying colorant of high coloring power. Thus, the need for efficient and practical processes for the enhancement of caramel colorant is present in the caramel colorant, food and beverage industries.

Over the years, many diverse processes have been developed to enhance the coloring power of caramel colorant solutions and to remove undesirable, non-color contributing contaminants from the caramel solutions. Examples of known processes for producing caramel colorants of increased coloring power include separation of a colorant solids concentrate by the addition of coagulating or precipitating agents, e.g. ethanol, to the caramel colorant solutions; separation of a colorant solids concentrate from caramel colorant previously treated with microorganisms, and dialysis of caramel colorant to obtain a colorant solids concentrate. A more recent example of a caramel colorant concentrating process is the use of ultrafiltration such as the process disclosed in U.S. Pat. No. 3,249,444 to Bollenback et al.

It was reported by Stinson and Willits, $Journ.$ $Assoc.$ $Offic.$ $Anal.$ $Chem.$ 46(2), pp. 329–330 (1963), that acid-proof caramel colorant could be separated from ash salts and sucrose by subjecting the caramel colorant to gel filtration using cross-linked dextran as the filter gel. According to the report, it was possible to separate acid-proof type caramel colorant from ash salts and sucrose in one pass through a large static column of Sephadex type filter gel.

While the above-mentioned processes for the enhancement of caramel colorant have been generally satisfactory in terms of the product produced, the processes have not been entirely satisfactory for implementation in commercial operations of large capacity due to, among other things, the relatively long periods of time necessary to affect an enhancement of the caramel colorant.

SUMMARY OF THE INVENTION

It is, therefore, an object of the present invention to provide a process for the enhancement of caramel colorant which can be conducted in a relatively short period of time and which produces a caramel colorant of improved coloring power and a reduced content of undesirable or non-color contributing substances.

Briefly, in its broader aspects, the present invention relates to a process for the rapid enhancement of caramel colorant which comprises passing a liquid containing caramel colorant through a size exclusion chromatographic material while subjecting the liquid to centrifugal forces.

Further objects, advantages and features of the present invention will become more fully apparent by reference to the following, more detailed description of the present invention.

DETAILED DESCRIPTION OF THE PREFERRED EMBODIMENTS

As mentioned previously, caramel colorant comprises high molecular weight caramel colorant solids which impart the coloring capability to the product, and a wide variety of low molecular weight materials including ash, sugars, inorganic salts and the like which do not contribute to coloring power of the caramel colorant. For convenience, the high molecular weight substances will be referred to hereinafter as "colorant solids", and the lower molecular weight materials will be referred to hereinafter as "non-colorants".

In accordance with the process of the present invention for the enhancement of caramel colorant, the colorant is caused to pass through a size exclusion chromatographic material (hereinafter referred to as an SEC material) while being subjected to centrifugal forces. Generally, the SEC material may be selected from a wide variety of substances which are capable of producing a separation between the high molecular weight caramel colorant solids and the lower molecular weight non-colorants of the caramel colorant. At least some SEC materials can be characterized as gel filtration media. Suitable SEC materials for the purposes of the present invention include kieselguhr, cellulose and dextran. A particularly suitable SEC material is cross-linked dextran such as that sold under the name Sephadex, especially Sephadex grade number G-25-C.

Centrifugal forces may be applied to the caramel colorant solution passing through the SEC material in a variety of ways in accordance with the present invention. Centrifugal force may be defined as the force which impels matter outward from a center of rotation. A presently preferred manner to apply these forces is to utilize a basket-type centrifuge capable of retaining the SEC material, and then passing the caramel colorant solution through the material while the basket is rotating at a relatively high rate of speed. The magnitude of centrifugal force applied may vary considerably but amounts in the range of about 10 G to about 2000 G, preferably about 100 to 1500 G, or even about 160 to 1000 G, have been found to be satisfactory. Generally, forces of less than about 10 G provide no significant increase in the rate of separation of the caramel solids while forces in excess of about 2000 G, although providing good yield give poor separation, and tend to be impractical economically in terms of the processing equipment required and power utilized while providing no significant advantage over applied forces of a smaller magnitude.

The process of the present invention may be conducted using various caramel feeds of differing concentrations. The feeds contacted with the SEC material may, for example, contain about 10 to 50, preferably about 15 to 40, weight % of colorant solids based on total solids. The total solids concentration, i.e., both colorant and non-colorant solids, of the feed may often be about 20 to 60 weight %, preferably about 25 to 50 weight %. The purified product often contains at least about 60 or 65 weight % color solids based on total solids, preferably at least about 75 or 80%.

As a general rule, various types of caramel colorants from suitable carbohydrates are capable of being treated by the process of the present invention so as to improve the coloring properties of the colorant and to remove undesirable non-colorant materials such as inorganic salts. Examples of caramel colorants which may be treated by the method include cane-sugar caramel colorants, malt caramel colorants, and corn-sugar or dextrose caramel colorants. The process may be particularly adapted to the enhancement of "acid-proof" caramel colorants produced by the sulfite-ammonia process which are used primarily by the beverage industry. Other systems for producing the caramel colorant feed may employ only ammonia or sulfite.

The efficiency of the present process for the enhancement of caramel colorant can be measured by a comparison of several properties of the enhanced colorant with the starting caramel colorant, e.g., by the yield of colorant (the total amount of colorant solids in the starting colorant which are passed through the size exclusion chromatographic material into the enhanced or enriched colorant), the percentage of colorant solids (the purity of the enriched colorant in terms of total solids in the colorant) and the decrease in potassium ion concentration from the starting caramel colorant to the enriched or enhanced colorant. The decreased potassium ion concentration is indicative of the removal of inorganic salts including, of course, potassium salts as well as sodium and other similar salts.

While it is generally desirable to maximize colorant yield and percentage of colorant solids in the product while minimizing the potassium ion concentration when utilizing the present invention, in practice it has been found that all of these properties have not generally been maximized simultaneously by appropriate selection of the process variables, but rather the maximization of one property of the product may tend to reduce one or more of the other properties of the product from their maxima. For example, it has been found that the process variables of concentration of colorant solids in the starting caramel colorant, quantity of colorant treated with a given amount of SEC material, the magnitude of centrifugal force applied, and the use of one or more subsequent aqueous washes may have a significant effect on the characteristics of the colorant product. Generally, higher yields of caramel colorant are achieved when the initial colorant is of lower solids concentration, the applied centrifugal force is relatively high, and the use of a high volume of colorant per volume of SEC material. In contrast, a higher caramel colorant enrichment in terms of colorant solids concentration and a greater potassium ion removal are achieved in the final product when a lower volume of initial starting colorant is used, the applied centrifugal force is relatively low and the concentration of colorant solids in the initial colorant is relatively high. The use of a subsequent aqueous wash of the SEC material tends to increase the colorant yield but at the expense of the colorant solids concentration in the final product.

While the above-mentioned process variables all affect the results of the process to at least some extent, it appears that the process variable which most strongly affects the colorant yield is the magnitude of the applied centrifugal force, and that the process variables which most significantly affect the final colorant concentration are the magnitude of the applied centrifugal force and the colorant solids concentration in the initial caramel colorant.

As mentioned previously, it is a significant feature of the process of the present invention that the properties of caramel colorants can be enhanced to at least approximately the same levels as those produced by known caramel colorant enhancement processes but, by use of the present process, the enhancement can be obtained in a much shorter period of time. For example, it has been found that caramel colorant can be passed through a static column of cross-linked dextran to produce a colorant having a colorant solids concentration of between about 85 and 95% with a yield of colorant between about 75 and 80% depending upon the dilution of the initial colorant. However, in order to achieve these results, it is necessary to allow the column to drain for a relatively extended period of time. In contrast, by use process of the present invention, comparable results in terms of yield and colorant solids concentration can be achieved in far less time, generally on the order of about ten to fifteen minutes.

The method of the present invention is further illustrated by the following examples and accompanying test data. In the examples, the effects of the varables of quantity of caramel colorant solution, the solids content of the caramel solution, the use of wash water, wash water temperature, and the magnitude of applied centrifugal force are illustrated. It should be understood that the examples are given for the purposes of illustration only and do not limit the invention as described herein.

EXAMPLE I

An aqueous solution of caramel colorant is subjected to centrifugal size exclusion chromatography. The starting caramel colorant used is a commercial acid-proof caramel sold by D. D. Williamson, Inc. under the type designation 11 DS double strength caramel having a colorant solids concentration of about 48%. Prior to treatment, the commercial caramel colorant is diluted with water to produce an aqueous solution having a total solids concentration of about 28.5%.

A conventional laboratory centrifuge is used in the centrifugal size exclusion chromatographic separation, the centrifuge being a Model UV centrifuge sold by the Damon-International Equipment Corporation and having a manganese-bronze perforated basket and a stainless steel draining chamber. The centrifuge is prepared for filtering the caramel colorant solution by lining the basket with a porous polyethylene sheet of sufficient dimensions to prevent stretch-opening due to subsequently applied centrifugal forces.

The SEC material used is a cross-linked dextran sold under the tradename Sephadex G-25-C gel by Pharmacia, Inc. of Piscattaway, New Jersey, U.S.A. The material is prepared by swelling or hydrating about 660 g of the dry Sephadex with tap water to produce a gel having volume of about 3300 ml. The SEC material is allowed to swell for about six hours at room temperature. Thereafter, about 3000 ml of the swollen SEC material is stirred with excess water and immediately transferred to the centrifuge basket rotating at about 660 rpm. The rate of spin of the centrifuge is then rapidly accelerated to the process velocity to form the gel material into a vertical bed wall in the basket and to remove interstitial water between the gel beads. If necessary, the bed wall may be shaped to substantial vertical uniformity by the addition of water while the basket is rotating at a relatively low speed or by sluicing the bed down at low speed and rapidly accelerating the basket again.

Once the bed wall of SEC material is formed, about 260.6 g of the above-mentioned caramel colorant solution is slowly added to the centrifuge basket rotating at a low speed of about 600 rmp. During the addition of the caramel colorant solution to the centrifuge basket, the solution is fed so as to evenly distribute the solution over the vertical wall of the rotating bed. The rate of rotation of the basket is increased to and maintained at about 1000 rpm (about 600 G's) until the flow of liquid from the basket ceases in about 10 to 15 minutes. The solution passing through the centrifuge basket is collected in a tared container and then measured so as to determine the yield of colorant solids, percent caramel color substance, colorant solids concentration and reduction in potassium concentration in the collected solution. The following results are realized:

| Run | Color Yield (%) | Color Substance (%) | Reduction of K+ Concentration (%) |
| --- | --- | --- | --- |
| 1 | 50.6 | 85.3 | 77.4 |
| 2 | 50.4 | 90.9 | 73.4 |
| 3 | 74.8 | 74.6 | 78.6 |
| 4 | 70.7 | 80.5 | 73.2 |

In run 3, a wash of 250 ml of tap water of about 10° C. is utilized to help facilitate the caramel colorant yield.

Color yield is determined by diluting about 0.2 ml of the initial caramel colorant solution to about 108 ml with distilled water and then swirling to assure homogeneity. The absorbance of the diluted caramel solution is measured at about 610 nm on a visible absorption spectrophotometer. A sample of the collected caramel colorant solution is also subject to the same dilution and measurement. Percentage color yield is determined by dividing the absorbance of collected caramel solution by the absorbance of the initial caramel solution and then multiplying by one hundred. The percent of color substances in the total dissolved solids is determined by using high performance-size exclusion chromatography.

Potassium ion concentrations of the initial caramel colorant solution and the collected solution are determined by mixing about 0.05 to 0.10 ml of the particular caramel colorant solution with about 1 ml of 10 M acetic acid, about 0.2 ml chloride solution (63.5% W/V), and diluting to about 100 ml in a volumetric flask. Each of the resultant solutions is aspirated into the flame of an atomic absorption spectrometer calibrated with a potassium or sodium standard. The concentration (ppm) of potassium indicated on the spectrometer is multiplied by the dilution factor to yield the concentration in each of the undiluted caramel colorant solutions.

The basic procedure of Example I is then repeated as is set forth hereinafter in Examples II-VIII. In these Examples, the effect of varying one or more of the process variables of (a) quantity of caramel colorant solution treated, (b) total solids concentration of the initial solution, and (c) the rate of rotation of the centrifuge are investigated. In Examples II-VIII, one or more of these variables is increased as shown in the following table where an "X" indicates that that particular variable was increased in magnitude over the value set forth in Example I.

| | Variable | | |
| Example | Quantity | Solids Concentration | Spin Rate |
| --- | --- | --- | --- |
| II | X | | |
| III | | X | |
| IV | | | X |
| V | X | X | |
| VI | | X | X |
| VII | X | | X |
| VIII | X | X | X |

EXAMPLE II

The procedure of Example I is repeated except that about 493.4 g of the caramel solution are utilized. The following results are obtained from the centrifugal size exclusion chromatography.

| Run | Color Yield (%) | Color Substance (%) | Reduction of K+ Concentration (%) |
| --- | --- | --- | --- |
| 1 | 83.1 | 77.5 | 64.4 |
| 2 | 66.2 | 82.6 | 54.4 |
| 3 | 93.2 | 68.7 | 66.8 |
| 4 | 80.8 | 74.2 | 53.2 |

EXAMPLE III

The procedure of Example I is repeated except that the percentage of solids in the caramel solution is 47.5 rather than 28.5 as in Example I. The following results are obtained from the centrifugal size exclusion chromatography of the caramel containing solution;

| Run | Color Yield (%) | Color Substance (%) | Reduction of K+ Concentration (%) |
|---|---|---|---|
| 1 | 47.6 | 97.8 | 88.4 |
| 2 | 45.0 | 91.3 | 68.2 |
| 3 | 61.1 | 89.2 | 88.3 |
| 4 | 68.2 | 76.6 | 59.7 |

This example illustrates that a higher solids content produces a relatively high purity resultant solution but that the yield is relatively low.

EXAMPLE IV

The procedure of Example I is repeated except that the basket is rotated at about 2600 rpm (about 1000 G) rather than at about 1000 rpm. The following results are obtained from the centrifugal size exclusion chromatography of the caramel containing solution;

| Run | Color Yield (%) | Color Substance (%) | Reduction of K+ Concentration (%) |
|---|---|---|---|
| 1 | 74.0 | 87.1 | 56.3 |
| 2 | 70.2 | 88.2 | 49.6 |
| 3 | 82.0 | 69.5 | 58.8 |
| 4 | 80.1 | 69.6 | 55.4 |

EXAMPLE V

The procedure of Example II is repeated except that the caramel solution has a solids content of about 47.5%. The following results are obtained from the centrifugal size exclusion chromatography caramel containing solution;

| Run | Color Yield (%) | Color Substance (%) | Reduction of K+ Concentration (%) |
|---|---|---|---|
| 1 | 51.5 | 85.3 | 57.9 |
| 2 | 48.1 | 91.0 | 71.4 |
| 3 | 64.3 | 76.8 | 55.7 |
| 4 | 60.0 | 80.9 | 51.0 |

EXAMPLE VI

The procedure of Example III is repeated except that the basket of the centrifuge is rotated at about 2600 rpm. The following results are obtained from the centrifugal size exclusion chromatography of the caramel containing solution;

| Run | Color Yield (%) | Color Substance (%) | Reduction of K+ Concentration (%) |
|---|---|---|---|
| 1 | 88.0 | 70.0 | 56.3 |
| 2 | 83.0 | 70.8 | 53.4 |
| 3 | 78.0 | 74.9 | 59.7 |
| 4 | 81.1 | 71.5 | 50.6 |

EXAMPLE VII

The procedure of Example II is repeated except that the basket of the centrifuge is rotated at about 2600 rpm. The following results are obtained from the centrigual size exclusion chromatography of the caramel containing solution;

| Run | Color Yield (%) | Color Substance (%) | Reduction of K+ Concentration (%) |
|---|---|---|---|
| 1 | 92.3 | 74.0 | 19.0 |
| 2 | 88.6 | 74.2 | 18.2 |
| 3 | 97.0 | 66.0 | 45.3 |
| 4 | 92.8 | 65.1 | 25.3 |

As is evident, the use of a relatively high solids concentration and a relatively high spin rate, while producing a high yield, did not reduce the potassium ion concentration to a great degree.

EXAMPLE VIII

The procedure of example V is repeated except that the basket of the centrifuge is rotated at about 2600 rpm. The following results are obtained from the centrifugal size exclusion chromatography of the caramel containing solution;

| Run | Color Yield (%) | Color Substance (%) | Reduction of K+ Concentration (%) |
|---|---|---|---|
| 1 | 82.2 | 76.6 | 36.5 |
| 2 | 86.1 | 69.2 | 52.9 |
| 3 | 84.5 | 70.7 | 51.0 |
| 4 | 75.3 | 76.7 | 51.2 |

While the present invention has been described with reference to particular embodiments thereof, it will be understood that numerous modifications may be made without departing from the spirit and scope of the invention.

It is claimed:

1. A process for enhancing the colorant properties of caramel colorant comprising passing an aqueous liquid containing caramel colorant through a size exclusion chromatographic material while subjecting the liquid to centrifugal force of about 10 G to about 2000 G and then collecting the caramel containing liquid having enhanced colorant properties.

2. A process of claim 1 in which the centrifugal force is about 160 to 1000 G.

3. A process of claim 1 or 2 in which the caramel colorant is acid-proof caramel.

4. A process of claim 1 or 2 in which said aqueous liquid contains about 20 to 60% solids.

5. A process of claim 4 in which the caramel colorant is acid-proof caramel.

* * * * *

UNITED STATES PATENT AND TRADEMARK OFFICE
CERTIFICATE OF CORRECTION

PATENT NO. : 4,325,743

DATED : April 20, 1982

INVENTOR(S) : Tibbetts et al.

It is certified that error appears in the above—identified patent and that said Letters Patent is hereby corrected as shown below:

Column 3, line 21, "caramel solids" should be "caramel colorant solids"

Column 5, line 32, "660" should be "600"

Column 5, line 43, "rmp" should be "rpm"

Column 5, line 64, "water of about" should be "water at about"

Signed and Sealed this

Fourteenth Day of September 1982

[SEAL]

Attest:

Attesting Officer

GERALD J. MOSSINGHOFF

Commissioner of Patents and Trademarks